United States Patent [19]

Petrie

[11] 4,113,684
[45] Sep. 12, 1978

[54] LOW TEMPERATURE CURE EPOXY-AMINE ADHESIVE COMPOSITIONS

[75] Inventor: Edward M. Petrie, Wilkinsburg, Pa.

[73] Assignee: Westinghouse Electric Corp., Pittsburgh, Pa.

[21] Appl. No.: 749,592

[22] Filed: Dec. 10, 1976

[51] Int. Cl.² .............................................. C08L 63/00
[52] U.S. Cl. ..................... 260/29.2 EP; 260/830 TW; 427/195; 428/413; 428/415; 428/416; 428/417; 428/418
[58] Field of Search ...... 260/830 TW, 830 R, 47 EN, 260/29.2 EP, 2 N; 427/195

[56] References Cited
U.S. PATENT DOCUMENTS

| | | | |
|---|---|---|---|
| 2,786,794 | 3/1957 | Gams | 428/454 |
| 2,828,236 | 3/1958 | West | 428/116 |
| 3,625,918 | 12/1971 | Heer et al. | 260/47 EN |
| 3,723,223 | 3/1973 | Le Compte | 260/830 TW |
| 3,842,035 | 10/1974 | Klaren | 260/47 EN |
| 3,860,541 | 1/1975 | Lehmann et al. | 260/18 PN |

Primary Examiner—Theodore E. Pertilla
Attorney, Agent, or Firm—D. P. Cillo

[57] ABSTRACT

A composition, which is suitable for use as an adhesive, is made by mixing: (A) 1 part of an adduct reaction product consisting of a solid epoxy resin and a stoichiometric excess of an aliphatic amine; with (B) about 1 part to about 6 parts of a reactive solid epoxy resin powder having an average particle size of from about 10 microns to about 420 microns, the mixture being capable of melting at temperatures of over about 60° C; wherein the epoxy of (B) remains unreacted until melting.

7 Claims, 2 Drawing Figures

LOW TEMPERATURE CURE EPOXY-AMINE ADHESIVE COMPOSITIONS

BACKGROUND OF THE INVENTION

Amine curing agents for single component epoxy resin adhesives for plastics are well known in the art, as taught by West in U.S. Pat. No. 2,828,236. Lehmann et. al., in U.S. Pat. No. 3,860,541, in order to improve curing times for epoxy adhesives, developed a composition containing a solid epoxy resin, and a solid curing agent consisting of the cooled admixture of an adduct of an epoxy resin with an aromatic or cycloaliphatic amine reacted at 80° C. to 200° C., and a liquid polyamine. The solid epoxy resin and the solid adduct-polyamine curing agent are mixed together to form an adhesive powder. This adhesive powder may be sprinkled on various fabrics or plastic sheets and hot rolled at about 80° C. to 130° C. to provide a cured adhesive film.

Cams et. al., in U.S. Pat. No. 2,786,794, taught hot melt adhesives for metals. Metal adhesion presents special problems due to the low porosity of most metal surfaces. Cams et. al. solved this problem by providing a solventless composition comprising an unreacted mixture of an epoxy resin and up to about 10 wt.% of a dicyandiamide or melamine and/or a polyamine such as ethylene-diamine, N:N-diethylene diamine or triethylene-tetramine as a hardening agent.

This unreacted composition can be formed into cold compressed solder sticks, which melt upon contact with hot metal surfaces, to form a very thin fluid which fills low porosity metal and glass surfaces. The composition can also be brushed onto the surfaces in molten, paste, or solution form. Hardening in Cams et. al., is conducted by heating at between 100° C. to 200° C., while the surfaces are pressed together by a vise, clamp, or other pressing equipment which goes through the curing cycle with the metal and adhesive. Shear strengths of about 1,450 psi. are acheived.

What is needed, is an adhesive composition that can be brushed onto joint surfaces or formed into intricate shapes to match joint geometry, has a long shelf life, allows at least ½ minute working time after melt bonding, cures at low temperatures, and which will provide joint shear strengths of at least about 1,000 psi. without requiring the extensive use of pressing equipment. The elimination of clamps in the curing process would be particularly advantageous in any continuous, commercial, production line operation requiring metal to metal bonding.

SUMMARY OF THE INVENTION

The invention is a solid reactive mass comprising a uniform dispersion from about 1 part to about 6 parts of reactive epoxy resin powder, and 1 part of a solid curing agent consisting of a reaction product adduct consisting of solid epoxy resin and a stoichiometric excess of a liquid aliphatic amine or a solid aliphatic amine. The material is an unreacted mixture of reactive epoxy resin powder and adduct, which can be used as an adhesive, and is capable of melting at temperatures of above about 60° C. and forming a cross linked adhesive material.

The adhesive has a long storage life and can be cold molded into pellets, rods, or intricate shaped design configurations. The cold molded adhesive can be melted on metal or glass substrates to be bonded, or applied with a hot melt gun apparatus with a zone heater in the nozzle, to form a single phase system. A second substrate can then be placed in contact with the adhesive while it is in melted form.

This adhesive, in one embodiment, is melt applied and allowed to cool to room temperature, during which time it cures to a thermoset state, to provide initial joint shear strengths between the substrates of about 700 psi. and joint shear strengths of about 1,100 psi. after aging. The adhesive, in another embodiment, can be mixed with water or other solvent to form a slurry, coated on metal surfaces to be bonded, and dried at room temperature to remove solvent. The coated metal may be stored, and when bonding is desired, the metal parts may be placed together, heated over about 60° C. and allowed to cool to room temperature, during which time the adhesive cures to provide joint shear strengths between the substrates of about 2,000 psi.

In all of the above curing processes, clamps or other fixturing equipment are not necessary except to align the parts in some instances. Other advantages of the above-described materials and processes are: assembly speed and operational simplicity; cure can be delayed to a more opportune time, allowing initial coating and storage of coated components; once formed by cold pressing or other techniques into proper shapes to match the joint geometry, operators need not carry out metering or mixing processes and so would avoid possible dermatitis or fume emission problems.

This high performance structural adhesive will find applications in the wood, glass, plastics, fabrics, and metal joining industries. It can be applied in solid or slurry form to bond a variety of substrates such as plastics, metals such as tin, aluminum, iron, copper, etc., glass, composites and dissimilar materials. It can also be used to seal terminals and leads into plastic moldings and to encapsulate discrete components.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
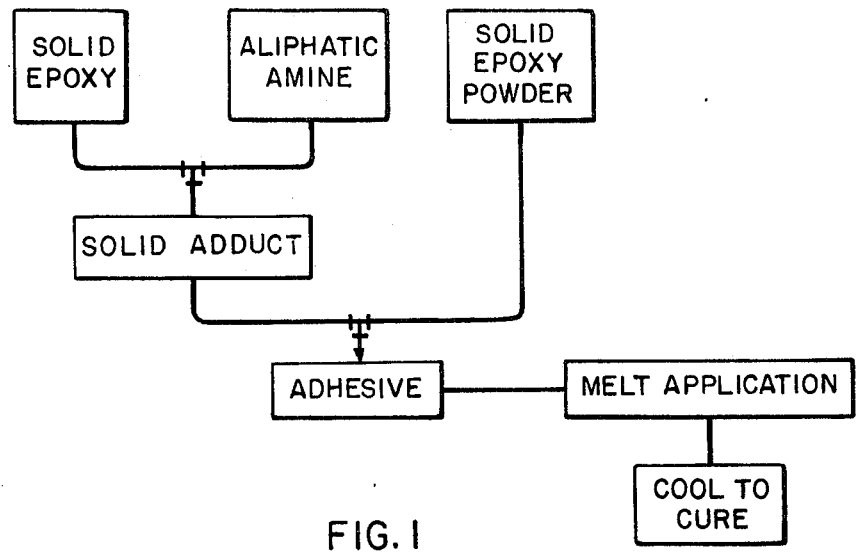
FIG. 1 shows a block flow diagram of one method of a solid coating and low temperature cure application of one embodiment of the adhesive of this invention.

One type of epoxide (epoxy resin) which may be used in the invention, is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

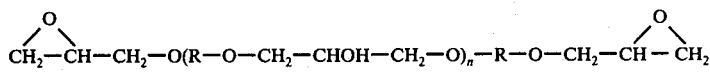

where n is an integer of the series 0, 1, 2, 3 ..., and R represents the divalent hydrocarbon radical of the dihydric phenol. Typically R is:

which is represented by the chemical structural formula:

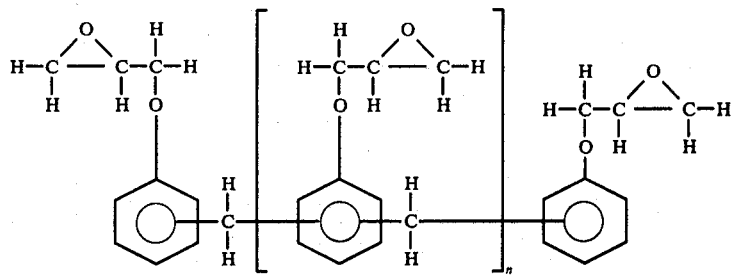

wherein n is an integer of the series 0, 1, 2, 3, etc.

Although epoxy novolac resins from formaldehyde are generally preferred for use in this invention, epoxy novolac resins from any other aldehyde such as, for example, acetaldehyde, chloraldehyde, butylaldehyde, fufuraldehyde, can also be used. Although the above formula shows a completely epoxidized novolac, other epoxy novolacs which are only partially epoxidized can be useful in this invention. An example of a suitable epoxy novolac is 2, 2, bis [p-(2,3-epoxypropoxy)-phenyl]-methane. These resins are well known in the art and reference may be made to *The Handbook of Epoxy Resins* for a complete description of their synthesis.

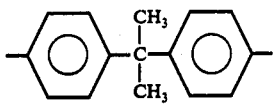

to provide a diglycidyl ether of bisphenol A type epoxide or

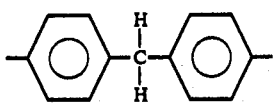

to provide a diglycidyl ether of bisphenol F type epoxide resin.

The bisphenol epoxides used in the invention have a 1, 2 epoxy equivalency greater than one. They will generally be diepoxides. Monoepoxides are not suitable because of poor cured tensile strength. By the epoxy equivalency, reference is made to the average number of 1, 2 epoxy groups,

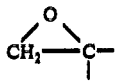

contained in the average molecule of the glycidylether. Typically, epoxy resins of bisphenol are readily available in commercial quantities and reference may be made to *The Handbook of Epoxy Resins*, by Lee and Neville for a complete description of their synthesis.

Other glycidylether resins that are useful in this invention include polyglycidylethers of a novolac. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

The product of the reaction is generally a massive oxidation resistant aromatic compound, one example of All of the above-described epoxy resins can be characterized by reference to their epoxy equivalent weight, which is defined as the mean molecular weight of the particular resin divided by the mean number of epoxy radicals per molecule. In the present invention, the suitable solid bisphenol A and bisphenol F epoxides will have a preferred epoxy equivalent weight of from about 330 to 6,000; and the suitable solid epoxy-novolac resins will have a preferred epoxy equivalent weight of from about 170 to 220.

The adhesive composition of this invention is a dispersed mixture of a reactive epoxy resin powder and a particulated, solid, reaction product adduct of a solid epoxy resin and a stoichiometric excess, based on the solid epoxy resin in the adduct, of a solid or liquid aliphatic polyamine, generally a difunctional amine. The epoxy resin powder, is selected from diglycidyl ethers of bisphenol A epoxies, diglycidyl ethers of bisphenol F epoxies, and their mixtures. The epoxy resin powder must have an average particle size range of from about 10 microns to about 420 microns (40 mesh U.S. Screen No.), with a preferred range of from about 37 microns (400 mesh U.S. Screen No.) to about 230 microns (63 mesh U.S. Screen No.). Over about 420 microns and there will be inadequate cross-linking on cure.

The adduct must contain a solid epoxy resin selected from diglycidyl ethers of bisphenol A epoxies, diglycidyl ethers of bisphenol F epoxies, and their mixtures. The amine can be solid or liquid but it must be an aliphatic polyamine to provide low temperature cure. The preferred aliphatic polyamines are diethylenetriamine, polyamideamine, triethylenetetramine, diethylamino propylamine, bis(hexamethylene) triamine, iminobispropylamine, tetraethylenepentamine and the like, and their mixtures.

The adduct curing agent will contain from about 0.20 part to about 1.5 parts amine for each 1 part by weight of epoxy resin in the adduct, to provide a suitable stoichiometric excess of amine. Less than about 0.20 part amine will allow premature cross-linking of the adduct. Over about 1.5 parts amine will excessively plasticize the adduct causing it to form a semi-solid or liquid. The two components, either alone or in a solvent, such as methyl ethyl ketone or acetone, are mixed together and generally heated at a temperature effective to form a solid, reaction product adduct. The solid adduct comprises long chain polymers and may be water soluble, depending on the degree of adduct reaction. This adduct provides the curing agent for these adhesive compositions and it is not further reacted with polyamines.

In this invention, the epoxy resin powder is preferably mixed, at temperatures up to about 40° C. but preferably at 25° C., with the already reacted, solid adduct which has been ground into powder form preferably having an average particle size range of from about 10 microns to about 420 microns, with a preferred range of from about 37 microns to about 230 microns. From about 1 part to about 6 parts of epoxy resin powder is used to 1 part by weight of solid, reaction product adduct to produce a stable, two phase system of epoxy powder and adduct, where the adduct is uniformly dispersed in the epoxy powder. This dispersed admixture may be "cold" pressed at temperatures of from about 20° C. to about 40° C., and about 50 psi. to about 400 psi., to form a compacted mass, generally in the form of a long cylinder.

The epoxy and aliphatic amine are generally reacted at between about 45° C. to about 125° C. to permit formation of the solid adduct. The melting point of the adduct powder must be close to the melting point of the epoxy powder, i.e., within + or − about 1° C. to about 50° C., preferably within about 1° C. to about 25° C., of the melting point of the epoxy powder, so that both phases will melt at about the same temperature to allow cross linking on melt bonding and the lower melting component will not be degraded. The melting point of the epoxy powder must be between about 55° C. to about 225° C.

At temperatures over about 60° C., generally between about 60° C. and about 225° C., and preferably at between about 75° C. and about 175° C., both powders melt and become compatible and capable of cross linking. Up to this point the epoxy powder remains unreacted. On being applied to hot metal substrate joints and cooling to room temperature, the adhesive completely cures to a thermoset state. This provides a metal to metal or glass bond which does not require lengthy cure schedules or any fixturing of the assembly and does not require an elevated, separate heat cure step, yet provides an initial joint shear strength of about 700 psi. and an aged joint shear strength of about 1,100 psi.

Since, the solid adduct of the adhesive used in the invention may be water soluble, the adhesive may contain a sufficient amount of water or other solvent to form a slurry. This slurry can then be applied to the metal surfaces to be bonded. The coating of adhesive may then be dried to remove the water, and the coated metal parts stored. The drying step is necessary to insure complete solvent removal. When bonding is desired, the coated metal parts may be placed together, heated over about 60° C., generally between about 60° C. and 225° C. to melt the components, and cooled to thermoset cross link and cure the adhesive. This provides a very simple application method and a storable coated product, and provides a metal to metal or glass bond which does not require lengthy elevated temperature cure schedules or fixturing other than alignment of the assembly, yet provides a final joint shear strength of about 2,000 psi.

In the embodiments described above, if less than about 1 part of epoxy powder/part of adduct is used, there will be loss of physical and heat resistance properties of the adhesive. Over 6 parts of epoxy powder/part adduct will result in inadequate cross linking of the epoxy powder and adduct on cure. These materials combine the desirable characteristics of thermosetting epoxy resins — high cohesive and adhesive strengths, permanence, and chemical resistance — and fast, simple application and processing characteristics.

Small amounts of pigments or filler particles, having an average particle size of from about 2 microns to about 420 microns, can be added to the above-described compositions as coloring agents, extenders, or property modifiers.

EXAMPLE 1

An epoxy composition was made from a mixture of epoxy powder and the adduct of a solid epoxy and an aliphatic amine. The following reaction components were mixed together at 25° C. in a blender: 100 parts by weight of a solid diglycidyl ether of bisphenol A resin having an epoxy equivalent weight of 475 to 575 and a Durran's melting point of 70° C. to 80° C. (sold commercially by Dow Chem. Co. under the Tradename DER 661) ground to have an average particle size of about 75 microns to 210 microns; and 20 parts by weight of a solid epoxy-polyfunctional aliphatic amine adduct.

The adduct was the reaction product of a solid diglycidyl ether of bisphenol A with an epoxy equivalent weight of 450 to 550 (Epon 1001) and a stoichiometric excess of diethylenetriamine (sold commercially by Shell Chem. Co. under the Tradename Epon C-111). The adduct components were in a methyl ethyl ketone solvent solution. The adduct components in solution were heated for about 12 hours at 100° C. to drive off the solvent and provide the solid adduct. The resulting solid, glassy adduct was ground from particles having an average particle size of about 75 microns to 210 microns before addition to the epoxy powder. This provided a stoichiometric excess of amine since the adduct contained about 0.30 part diethylenetriamine per 1 part by weight of epoxy resin. This composition provided 5 parts epoxy powder per part epoxy-aliphatic amine adduct.

This admixture of solid epoxy and adduct was dry mixed for about 5 minutes at 25° C. in a blender until it was homogeneous. After dry blending, the adhesive was cold pressed at about 200 psi and 25° C., into compacted pellets. The adduct had a melting point of 93° C. and the epoxy powder had a melting point of 72° C. The solid adhesive had a melting point of 94° to 100° C. as determined with a Fisher-Johns Melting Point Apparatus equipped with a microscopic eyepiece. When wiped onto a substrate preheated over this melting point, both phases melt and are capable of cross linking during cooling. In this embodiment complete cure to the thermoset state can progress as the material cools to 25° C.

The type and amount of epoxy powder was chosen so that it would react completely with the solid adduct when they are made compatible through melt activation. The adhesive is, therefore, a two phase material:

the first phase is the epoxy-amine adduct and the second phase is sufficient epoxy powder to react with the adduct upon melting. The adduct is dispersed evenly throughout the epoxy powder and the system is stable because of the separation of the two solid phases. The epoxy powder remains unreacted until melt application.

A solid pellet of adhesive was applied to a 150° C. preheated abraded aluminum panel by wiping it across the area to be bonded. Another preheated panel was immediately mated with the coated substrate and the joint was allowed to cool at room temperature without pressure on the bond. The tensile-shear strengths of these joints were determined per ASTM D-1002 at 25° C. and 122° C. Cure is believed to occur rather rapidly as the material cools to room temperature because of residual heat from the application procedure. However, shear strength was noticed to increase on aging at laboratory ambient for 1 month. The results of the tensile-shear tests are described in Table 1 below. Creep tests were also conducted on these samples. This adhesive is capable of supporting an 80 psi. load at 60° C. without noticeable creep.

TABLE 1

| Shear Strength After 25° C Cure | | Shear Strength After Aging 1 Month At 25° C |
|---|---|---|
| 25° C | 122° C | 25° C |
| 721 psi. | 233 psi. | 1,097 psi. |

Gel time of this adhesive was measured to determine the working time restrictions. Gel time was determined by melting the adhesive in an aluminum dish on a preheated hot plate and measuring the time until the adhesive gelled. Gellation was the point at which the adhesive could not be transferred to a wooden probe because of insufficient flow. Gel time of this adhesive was 2½ minutes at 100° C. and ½ minute at 150° C., which is well within the limits of operator capability. One particularly advantageous alternative solid application approach is to apply the adhesive as a preform to a cold substrate, heat both the adhesive and substrate at 150° C. and allow the adhesive and substrate to cool.

EXAMPLE 2

An epoxy composition, similar to the adhesive of EXAMPLE 1, was made from a mixture of epoxy powder and the water soluble adduct of a solid epoxy and an aliphatic amine. The following components were mixed together at 25° C. in a reaction vessel: 20 parts by weight of a solid diglycidyl ether of bisphenol A having an epoxy equivalent weight of 475 to 575 (DER 661) ground to have an average particle size of about 75 microns to 210 microns; 16 parts by weight of water; and 20 parts by weight of a 50% solids polyfunctional aliphatic amine adduct solution.

The adduct solution was the reaction product of a solid diglycidyl ether of bisphenol A with an epoxy equivalent weight of about 450 to 575 and a stoichiometric excess of an aliphatic polyamide-amine. The adduct was in a 50 wt.% water solution. The adduct contained about 0.20 to 0.50 part polyamide-amine per 1 part by weight of epoxy resin (sold commercially by Celanese Resin Co. under the Tradename Epi-Cure W-50-8535). This composition provided 2 parts epoxy powder per 1 part solid epoxy-aliphatic amine adduct.

This admixture was high shear mixed, for about 5 minutes at 25° C. in a blender, until it was homogeneous and had a viscosity of about 10,000 cps. at 25° C. The adhesive admixture slurry was brush coated onto abraded aluminum panels at 25° C. and allowed to air dry for 16 hours at 25° C. The two coated aluminum panel surfaces were then mated, spring clamped, to keep proper alignment rather than to further bonding, placed in a forced air oven for 5 minutes at 125° C., and allowed to cool to room temperature. The difference in melting point between the adduct and the epoxy powder was about 25° C. The melting point of the dried adhesive was between about 70° C. to 80° C. The completely cured aluminum-aluminum lap shear specimens were tested per ASTM D-1002 at 25° C. The results are shown below in Table 2:

TABLE 2

| Shear Strength After Complete Cure |
|---|
| 25° C |
| 2,130 psi. |

This adhesive is particularly useful due to its ease of application. After application, by brushing, spraying or other means, and drying the coated parts can be stored for up to 1 year, melt bonded at temperatures over about 80° C. under contact pressure in a suitable heating means and cooled to thermoset cross link and cure the adhesive.

Figure 2:
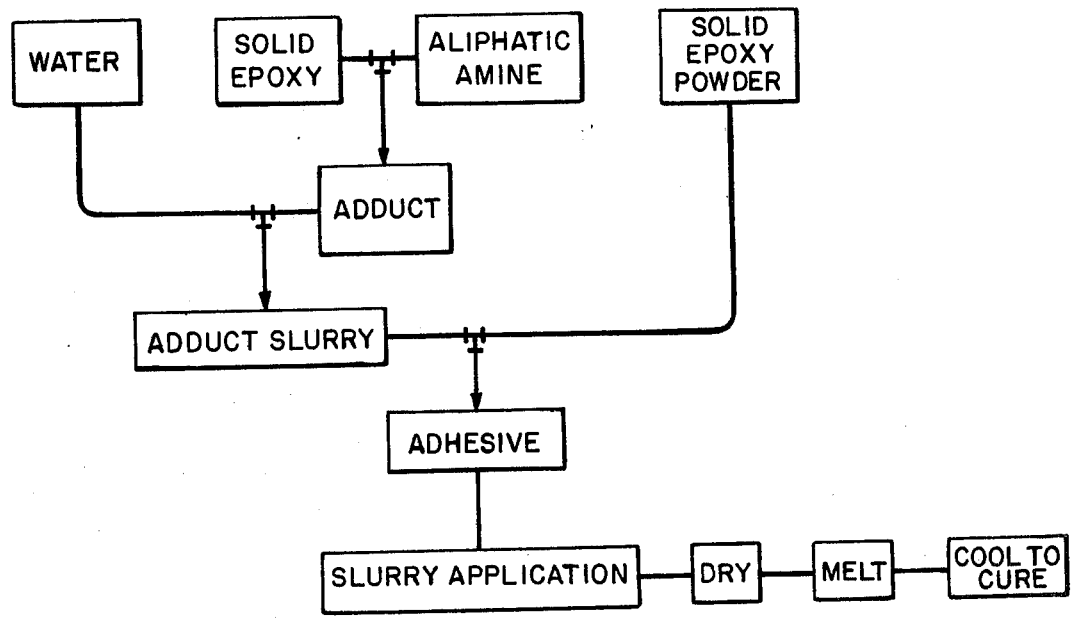
FIG. 2 shows a block flow diagram of one method of a slurry coating, drying and low temperature cure application of one embodiment of the adhesive of this invention.

The variety of adhesives described hereinabove can be made with bisphenol F epoxies, and the other epoxies and amines described as useful. They can be used to bond glass, plastics, other metals such as copper, tin, iron, etc., and many other materials. FIGS. 1 and 2 show the flow diagrams for the methods of EXAMPLES 1 and 2.

I claim:

1. A composition admixture which consists of:
(A) a particulated solid reaction product adduct consisting of:
  (i) 1 part by weight of a solid epoxy resin selected from the group consisting of diglycidyl ethers of bisphenol A epoxy resins, diglycidyl ethers of bisphenol F epoxy resins, and mixtures thereof, and
  (ii) about 0.20 part by weight of about 1.5 parts by weight of an aliphatic polyamine, to provide a stoichiometric excess of amine, and
(B) about 1 part by weight to about 6 parts by weight, for each 1 part of adduct, of a reactive solid epoxy resin powder having an average particle size range of from about 10 microns to about 420 microns, selected from the group consisting of diglycidyl ethers of bisphenol A epoxy resin, diglycidyl ethers of bisphenol F epoxy resins and mixtures thereof, having a melting point of between about 55° C. to about 225° C.; wherein the composition is a solid two phase reactive mass comprising a uniform solid dispersion of adduct (A) and epoxy powder (B), wherein the melting point of the adduct is within about 1° C. to about 50° C. of the melting point of the epoxy powder; said composition being capable of melting at temperatures of over about 60° C., and forming a cross linked adhesive material on cooling after melting.

2. The composition of claim 1, wherein the epoxy resin in (A) and (B) is a diglycidyl ether of bisphenol A, the adduct is water soluble and the aliphatic amine is selected from the group consisting of diethylenetriamine, polyamide-amine, triethylenetetramine, diethylamino propylamine, bis (hexamethylene) triamine, iminobispropylamine, tetraethylenepentamine and mixtures thereof.

3. The composition of claim 2, wherein the adduct is a solid having an average particle size of from about 10 microns to about 420 microns.

4. The composition of claim 2, wherein the composition admixture also contains sufficient water to form a slurry.

5. A method of making an adhesive composition consisting of admixing:
(A) a particulated solid reaction product adduct consisting of the mixture of:
(i) 1 part by weight of a solid epoxy resin selected from the group consisting of diglycidyl ethers of bisphenol A epoxy resins, diglycidyl ethers of bisphenol F epoxy resins, and mixtures thereof, and
(ii) about 0.20 part by weight to about 1.5 parts by weight of an aliphatic polyamine, to provide a stoichiometric excess of amine, at a temperature effective to permit formation of the adduct, and
(B) about 1 part by weight of about 6 parts by weight, for each 1 part of adduct, of a reactive solid epoxy resin powder, selected from the group consisting of diglycidyl ethers of bisphenol A epoxy resins, diglycidyl ethers of bisphenol F epoxy resins and mixtures thereof, having a melting point of between about 55° C. to about 225° C. and an average particle size of from about 10 microns to about 420 microns; wherein the epoxy of (B) remains unreacted with the adduct of (A), the melting point of the adduct is within about 1° C. to about 50° C. of the melting point of the epoxy powder and the admixture is a solid two phase composition of dispersed solid adduct said epoxy powder.

6. The method of claim 5, wherein the epoxy resin in (A) and (B) is a diglycidyl ether of bisphenol A, the adduct is water soluble and the aliphatic amine is selected from the group consisting of diethylenetriamine, polyamide-amine, triethylenetetramine, diethylamino propylamine, bis (hexamethylene) triamine, iminobispropylamine, tetraethylenepentamine and mixtures thereof.

7. The method of claim 5, wherein the adduct is formed at a temperature of between about 45° C. and about 125° C. and the adduct and the solid epoxy resin are admixed at temperatures of up to about 40° C.

* * * * *